April 4, 1939.  T. P. CHASE  2,153,076
HYDRAULIC BRAKE
Filed Nov. 1, 1937
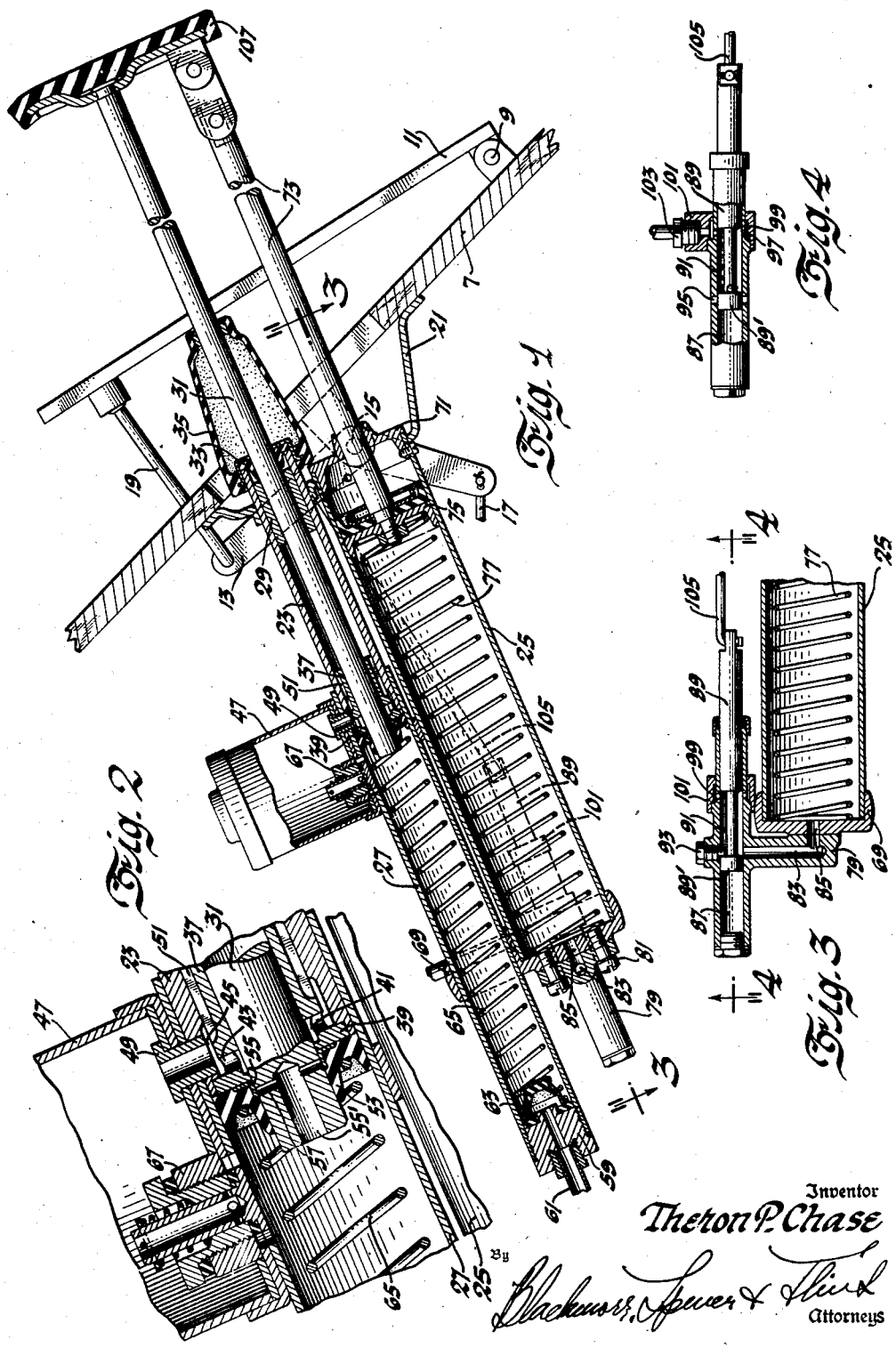
Inventor
Theron P. Chase
By
Blackmore, Spencer & Hurd
Attorneys Patented Apr. 4, 1939

2,153,076

UNITED STATES PATENT OFFICE 2,153,076

HYDRAULIC BRAKE

Theron P. Chase, Detroit, Mich., assignor to General Motors Corporation, Detroit, Mich., a corporation of Delaware Application November 1, 1937, Serial No. 172,099

5 Claims. (Cl. 192—3)

In connection with the hydraulic brake systems as used on vehicles it has been proposed to provide servo devices to supplement the manually applied force acting to depress the plunger within the master cylinder. This invention is concerned with such supplementary mechanism.

An object of the invention is to associate with the master cylinder a cylinder and piston assembly wherein the piston moves in response to differential air pressures and with a force sufficient to take up brake shoe clearance and, if desired, to spread the shoes with light pressure against the drums.

As a further object the invention aims to control the air pressure device by valve means which shall be responsive to movements of the accelerator pedal.

As a further object the structure is designed for the purpose of reducing the brake pedal pressure to a predetermined extent and such reduction is to be effective for all degrees of braking, the action occurring in response to a release of the manual pressure applied to the accelerator pedal.

Other objects and advantages including efficient operation and simple construction will be understood from the following description.

In the drawing:

Figure 1 is a transverse section through the master cylinder and the associated servo device.

Figure 2 is an enlarged section of a portion of the master cylinder and reservoir.

Figure 3 is a section on line 3—3 of Figure 1.

Figure 4 is a view in elevation, partly in section, as seen from line 4—4 of Figure 3.

It will be understood that the invention has been primarily designed for use with the master cylinders of hydraulic brake systems as used on vehicles. It is unnecessary to illustrate the whole vehicle, the toe board being shown on the drawing and designated by numeral 7. To the toe board the accelerator pedal 11 is pivoted at 9. The invention is not concerned with the parts by which the pedal 11 controls the throttle of the engine but there is shown a lever 13 pivoted to the toe board at 15. A link 17 connects this lever 13 to the throttle valve, not shown, and the lever is depressed by a plunger 19 pivoted thereto and reciprocated by the pedal 11.

A bracket 21 secured to the toe board supports the upper end of two cylinders 23 and 25. Cylinder 23 together with its axial extension 27 forms the master cylinder of the hydraulic brake system. The upper end of the master cylinder has a cylindrical guide 29 for the passage of a plunger 31. Suitable sealing means 33 and a flexible boot 35 are shown, the functions of these elements being obvious. A lower plunger guide is shown near the end of cylinder 23 and identified by numeral 37. The extreme end of cylinder 23 is formed with a shoulder to receive a flange 39 of guide 37, there being an annular recess 41 at the end of guide 37 and radial passages 43 extending therefrom. Passages 43 communicate with an annular groove 45 formed in cylinder 23. A reservoir 47 is suitably secured to the cylinders 23 and 27 and an apertured connecting member 49 affords communication between the reservoir and the groove 45. The space between the guides 29 and 37 is always in communication with the reservoir by means of channel 51 formed in guide 37.

A rubber seal 53 equipped with an angular metal annulus 55 engages the reciprocable plunger, fits against the disc 39 and also against the wall of the cylinder 27. The end of the plunger has an axial passage 55' communicating with radial passages 57 so that in the fully retracted position of the plunger the region within the cylinder 27 may communicate with the reservoir by means of the passages above described. At the end of the master cylinder is apertured plug 59 for connection with the pipe line represented by numeral 61 extending to the several wheel cylinders as usual. A pressure valve may be mounted at the outlet of cylinder 27 if it be desired to maintain a limited degree of pressure in the wheel cylinders and pipe lines. The valve 63 is illustrative of such an expedient. Between this valve 63 and the seal 53 is a spring 65 which serves to hold the seal in position and to offer resilient resistance to the flow of fluid back to the master cylinder through the valve 63. A non-return valve represented as a whole by numeral 67 is shown as operatively related to the reservoir and cylinder 27. This valve is adapted to be closed when pressure is developed within cylinder 27 but to open under suction to admit fluid to said cylinder 27 from the reservoir.

Cylinder 25 in addition to its support by bracket 21 is made rigid with cylinder 27 by a bracket 69, this bracket serving also as an end closure for cylinder 25. Cylinder 25 has an upper end closure 71 for the passage of the piston rod 73 which is attached to a piston 75, the latter being sealed as shown in the drawing. A spring 77 in abutment with end closure 69 engages the piston 75 and is adapted to be compressed by an inward reciprocation of said piston. A valve 79 is attached to the end closure 89 by fastening screws 81. The valve has an opening 83 registering with an opening 85 in the end closure and leading to a longitudinal passage 87 in the main portion of the valve. Reciprocable within passage 87 is a valve plunger 89. The plunger is formed with a recess 91 between its major portion and an end disc 89'. The wall of passage 87 is provided with a stop 93. Air openings in the wall marked 95 are so located that they are covered by the end disc 89' when the plunger approaches and engages the stop 93. Other apertures 97 open into a recess 99 within an end cap 101, the latter having a pipe connection 103 for communication with the engine intake manifold. The plunger 89 is connected by a link 105 to the lever 13.

A pedal pad 107 is suitably mounted on the end of plunger 31. This pad is also connected to the piston rod 73 whereby the hydraulic master cylinder may be actuated by manual pressure on the pedal pad or by differential air pressure on the opposite sides of piston 75.

The operation of the brakes by the pedal pad and the master cylinder is conventional. Depression of the pedal reciprocates the plunger through seal 53. This decreases the capacity of cylinder 27 and the developed pressure insures the closure of valve 67. The movement of the plunger also cuts off communication with the reservoir through passages 57 and 45. The transmission of a fluid medium through pipe lines 61 applies the brakes. Such depression of the brake pedal also depresses piston 75 against spring 77. The parallel relation of piston rod 73 with plunger 31 prevents any rotation of plunger 31 about its longitudinal axis. When the brake pedal is returned by spring 77 or by any other return spring the valve 67 may open to admit fluid to cylinder 27 in the event that this return movement develops suction. When the plunger is fully retracted the reservoir communicates with cylinder 27 by way of passages 45, 41 and 57.

The above operation is modified by the servo device in the following way. If before applying the brake the accelerator pedal is completely released, its release operates through the instrumentality of lever 13, link 105 and plunger 89 to open the cylinder 25 to the engine vacuum by way of passages 85, 83, 87 and 99, the communication being made possible by the position of the recess 91 in the plunger. Figures 3 and 4 show the parts in this position of retracted accelerator. The normal air pressure above piston 75 thereupon moves the piston 75 downwardly and its rod pulls upon the pedal and reciprocates the plunger 31 within the master cylinder. It does this even if no pressure is applied manually to the brake pedal. The size of cylinder 25 is so selected that a predetermined force is applied, a force sufficient to move the shoes into contact with the drum and, if desired, to exert a slight pressure. If, then, manual pressure is applied to effectively spread the shoes against the drum, the manual pressure required is reduced below that which would be required in the absence of the servo and owing to the length of the air cylinder the reduction in the required manually applied force is effective throughout the period of brake application, or as long as the accelerator is in its released position. The removal of the foot from the brake pedal releases the brake except for the slight force which is still being applied by the servo device. When the accelerator pedal is again depressed the plunger 89 moves to close the suction opening and to open the cylinder 25 to atmospheric air by uncovering the openings 95. The low rate spring 77 thereupon restores the brake parts to completely released position.

I claim:

1. Hydraulic brake applying means comprising a master cylinder, a plunger reciprocable therein, a pedal pad carried by said plunger, an air cylinder, a piston therein having a rod projecting from the cylinder, said rod being parallel to said plunger and connected to said pad whereby the plunger is restrained from rotation about its longitudinal axis, a conduit opening to said air cylinder and adapted to be connected to a source of suction, a valve in said conduit, an accelerator pedal, connections therefrom adapted to open said valve to the atmosphere when the accelerator pedal is depressed and to said source of suction when released.

2. The invention defined by claim 1, together with a low rate spring in said air cylinder adapted to return the plunger to brake released position when the accelerator pedal is depressed.

3. The invention defined by claim 1, said air cylinder being elongated and of such diameter as to apply a force to said plunger only sufficient to take up brake shoe clearance and to lightly apply the brakes, whereby a relatively low manually applied force is required throughout the brake applying movement of the plunger.

4. Hydraulic brake applyng means comprising a direct acting master cylinder, a parallel relatively small but elongated air cylinder, a directly applied plunger reciprocable in the master cylinder, a piston with a rod in the air cylinder, a manually operable pad connected to the adjacent ends of the plunger and piston rod, a conduit for connecting said air cylinder to a source of suction, a valve in said conduit, a throttle controlling accelerator, means associated with said accelerator to control said valve, the combined manual and suction forces acting on said plunger in response to the opening of said valve to permit the provision of a relatively high mechanical advantage in the brake operating system, the structural arrangement of the plunger, piston rod and pad preventing rotation of the plunger about its axis.

5. The invention defined by claim 4 together with a low rate return spring within said air cylinder and acting on the piston thereof.

THERON P. CHASE.